United States Patent Office 3,242,157
Patented Mar. 22, 1966

3,242,157
IN SITU FORMIC ACID EPOXIDATION OF BUTA-
DIENE/ALKYL AROMATIC COPOLYMERS WITH
A BORIC ACID CATALYST
Seymour M. Linder, Baltimore County, Md., assignor to
FMC Corporation, New York, N.Y., a corporation of
Delaware
No Drawing. Filed Dec. 20, 1962, Ser. No. 246,006
3 Claims. (Cl. 260—94.7)

The present invention relates to the epoxidation of copolymers of butadiene, and more particularly, to the in situ formic acid epoxidation of copolymers of butadiene in the presence of boric acid.

The epoxidation of various olefinically unsaturated compounds using the in situ formic acid technique is well known. By this procedure, the epoxidizable material is reacted with formic acid and hydrogen peroxide in the presence of an auxiliary acid. The hydrogen peroxide reacts with the formic acid, thereby forming performic acid which acts as the epoxidizing medium. These reactions have been carried out in the presence of various auxiliary acids including organic acids such as para-toluene sulfonic acid, methane sulfonic acid, strong carboxylic acids such as maleic, fumaric and oxalic, and inorganic acids such as phosphoric, sulfuric, hydrochloric, nitric and boric. Prior investigators have found that phosphoric and sulfuric acids are the preferred auxiliary acids for these epoxidation reactions. The use of boric acid has never been shown to be of any particular advantage, and in fact has been found to be inferior to phosphoric acid and sulfuric acid.

In the epoxidation of copolymers of butadiene, particular difficulty has been found in trying to achieve high oxirane contents. When the in situ formic acid epoxidation of these copolymers is carried out in the presence of phosphoric acid, the generally preferred auxiliary acid, high oxirane oxygen contents cannot be achieved. As the reaction proceeds, the oxirane content of the copolymer rises to a moderate value and then, as further reaction takes place, degradation of the product results in a lowering of the oxirane content. Accordingly, it was not believed heretofore that epoxidation of butadiene copolymers to high oxirane contents could be achieved by the in situ formic acid epoxidation technique.

It is an object of this invention to provide a technique for epoxidizing copolymers of butadiene to relatively high oxirane oxygen contents using the in situ formic acid epoxidation technique.

This and other objects will become apparent from the following description of this invention.

I have now discovered that quite surprisingly, when the in situ formic acid epoxidation of a copolymer of butadiene containing 5–50% by weight of an alkyl aromatic comonomer is carried out in the presence of boric acid, a much improved result is obtained. By operating in the presence of boric acid, copolymers having high epoxy oxygen contents, heretofore not possible when using phosphoric acid as the auxiliary acid, are readily achieved.

The epoxidation procedure of this invention is suitable for the epoxidation of copolymers of butadiene and alkyl aromatic compounds, including monoalkyl and polyalkyl aromatic compounds such as toluene, xylene (including ortho-, meta-, and para-xylene and mixtures thereof), mesitylene, tetralin, ethylbenzene, diethylbenzene, cumene, cymene, durene, methylnaphthalene, dimethylnaphthalene, and the like. Heterocyclic monoalkyl and polyalkyl aromatic compounds such as picoline and lutidine may also be used. The epoxidation procedure of this invention is particularly advantageous for butadiene copolymers containing 5–50% by weight of the alkyl aromatic compound. When the copolymer contains less than about 5% alkyl aromatic comonomer, it has the characteristics of a homopolymer of butadiene and derives no special advantages from the particular process of the present invention. The copolymer should contain at least about 50% of butadiene in order to provide sufficient unsaturation to allow a high oxirane content upon epoxidation. These copolymers are well known and have been fully described in the literature.

The butadiene copolymers are conveniently prepared using a finely divided alkali metal catalyst, such as sodium, potassium, or lithium, or a mixture of alkali metals, or their alloys, at elevated temperatures. Alkali metal hydride catalysts are also effective in this reaction, as well as other catalysts for the preferential reaction of the olefin with the alkyl side chain rather than the aromatic ring. For reasons of economy, sodium is a preferred catalyst. Rapid conversion is obtained using a catalytic amount of finely divided sodium, in mass or solution polymerization, by known techniques for sodium catalyzed polymerization. For example, sodium may be dispersed in an inert hydrocarbon diluent such as benzene or kerosene, in the presence or absence of a dispersing agent. If desired, the catalyst may be suspended in a polyalkyl aromatic compound such as xylene, for ultimate incorporation into the polymeric structure. Useful methods of preparing catalysts for this reaction are well known in the art.

The amount of polymerization catalyst employed may be varied, depending on the desired properties of the product, but normally is in the range of 0.1 to 10 parts of catalyst per 100 parts of diene monomer. Excellent results are normally obtained in the range of 3 to 5 parts catalyst per 100 parts of diene monomer. The catalyst may be dispersed in an inert solvent for the reactants, such as benzene, aliphatic hydrocarbons such as petroleum ether, decalin and the like. In general, it is convenient to employ solvent boiling in the range of 50–150° C., although the boiling range of the solvent is not critical. Normally a solvent is used which can be distilled or otherwise stripped from the reaction mix after polymerization. As previously stated, bulk polymerization in the absence of added solvent or diluent may also be carried out, whereby the catalyst is dispersed in the alkyl aromatic compound, which compound is then incorporated into the product during the polymerization reaction.

The condensation reaction generally occurs at temperatures above about 75° C., the reaction temperature being selected to produce condensation products in the desired molecular weight range. The reaction is conveniently carried out in an autoclave, by introducing therein the starting hydrocarbons and the catalyst, and heating the reaction mixture to a temperature between about 75° and 200° C. for several hours, preferably while agitating the mixture. After the polymerization reaction has proceeded to the desired point, conveniently measured, for example, by the consumption of butadiene or by removing and testing a sample of the product, the mixture is cooled or otherwise quenched, and catalyst, diluent and unreacted monomers, if any, are removed, all by standard procedures. The catalyst is conveniently removed by washing with water or acid, and volatile materials are readily distilled.

The butadiene copolymer is epoxidized in accordance with this invention by the in situ formic acid technique using boric acid as the auxiliary acid. The amount of formic acid used in the epoxidation may vary over wide limits depending upon the particular butadiene copolymer used and the degree of epoxidation desired. In general, about 0.05–0.25 equivalent of formic acid should be present for each double bond equivalent of butadiene copolymer. It has been found that more than about 0.25 equivalent of formic acid results in the formation of ring-opened product. The use of less than about 0.05 equivalent of formic acid results in unduly long reaction times. Best results are obtained with about 0.1–0.2 equivalent of formic acid per double bond equivalent. Generally, 90% formic acid is employed, although formic acid of greater or lesser strength is also suitable.

The amount of hydrogen peroxide present during the reaction may also be varied over wide limits. Theoretically, one equivalent of hydrogen peroxide should be present for each double bond equivalent which is desired to be epoxidized in the butadiene copolymer. Best results are obtained when the hydrogen peroxide is present in at least this theoretical amount, and preferably in excess. The excess may vary from 1–3 times the theoretical amount indicated above. It is generally desirable that the epoxidized copolymer contain at least about 6% oxirane oxygen. This means that at least about 13 parts by weight of hydrogen peroxide must be present per 100 parts of copolymer. Preferably, about 8.5–9% epoxy oxygen is desired in the epoxidized copolymer product, in which case about 35–50 parts of hydrogen peroxide are employed per 100 parts of copolymer. Generally, 50% hydrogen peroxide is employed.

The novel feature of the present invention is the use of boric acid as the auxiliary acid or catalyst for the epoxidation reaction. The amount of boric acid present may be varied from about 0.02–0.15 mole of boric acid per mole of double bond in the copolymer. The upper limit of boric acid is actually determined by the solubility of boric acid in the aqueous phase of the reaction mixture. When less than about 0.02 mole of boric acid is used, the reaction is too slow. For best results, about .05–.12 mole of boric acid is used.

The reaction is generally conducted in benzene solution, but other hydrocarbons such as toluene and xylene, or chlorinated hydrocarbons such as chloroform and carbon tetrachloride can also be used as the solvent. In fact, any inert organic compound which does not react with hydrogen peroxide or performic acid could be used as the solvent. The solvent is generally present in an amount of about 1–5 parts by weight per part of butadiene copolymer. The optimum amount of solvent is about 2–3 parts by weight per part of butadiene copolymer.

The epoxidation process of this invention may be carried out over a wide range of temperatures varying from about 0–100° C. At temperatures below about 0° C. the reaction is too slow, while at temperatures above about 100° C. excessive ring-opening of the product is encountered. Preferably, a temperature of about 50–80° C. is employed. When benzene is used as the solvent, this temperature is conveniently maintained by refluxing the reaction medium.

The epoxidation reaction is generally conducted at atmospheric pressure for convenience, but can be carried out under reduced or elevated pressure, if desired. Thus, if heat removal by refluxing benzene is desired at a temperature below about 70° C., the reaction could be conducted under a slight vacuum. If a temperature above about 75° C. is desired, using benzene as solvent, the reaction could be conducted under pressure.

The reaction time will vary depending upon the reaction temperature, the nature of the copolymer being epoxidized, and the concentration of the reactants. Generally, the reaction mixture is sampled at periodic intervals and the progress of the reaction is determined. The hydrogen peroxide content of the reaction medium may be checked periodically by titrating a sample with 0.1 N ceric sulfate. Consumption of hydrogen peroxide during the reaction is evidenced by a drop in ceric sulfate titer. For a discussion of this technique, see Analytical Chemistry, volume 20, page 1061. The epoxidation reaction is allowed to continue until analysis of the samples indicates that the reaction is complete, or the desired degree of the epoxidation has taken place.

The epoxidized copolymers resulting from the novel process of this invention are useful as thermosetting resins and as plasticizers and stabilizers for vinyl resins. These epoxidized copolymers may be cured with a conventional polyfunctional active hydrogen curing agent such as a polycarboxylic acid or its anhydride or a polyamine.

The following examples, illustrating the novel epoxidation process disclosed herein, are presented without any intention that the invention be limited thereto. All parts and percentages are by weight.

*Example 1*

A mixture of 400 g. of meta-xylene, 300 ml. of benzene and 200 ml. of sodium dispersion, prepared by dispersing about 30% of sodium in benzene, was charged under nitrogen to an autoclave, sealed and heated to 90° C. The gases were vented, and to the autoclave was charged a total of 1000 g. of butadiene under 15 p.s.i.g. pressure. The temperature was maintained at about 90° C., and the pressure at 10–15 p.s.i.g., during addition of the butadiene. After all the butadiene had been added the reaction was continued for 30 min. and the reaction mixture was cooled to room temperature and quenched into excess water. The aqueous phase was discarded, and the oil phase was neutralized, washed, and stripped of solvent. The residue was 1400 g. of a fluid copolymer oil having a viscosity of 70 c.p.s. at 25° C., and an iodine number of 313. The copolymer contained 28% bound xylene.

A mixture of 100 parts of the copolymer of butadiene and xylene, 240 parts of benzene, 10 parts of 90% formic acid, and 5 parts of boric acid was heated to reflux and 90 parts of 50% hydrogen peroxide was added to the mixture over a period of 1 hour. Samples of the reaction mixture were taken at 0.5 hr. intervals and analyzed for oxirane content and viscosity.

| Time after end of $H_2O_2$ addition, hrs. | Oxirane oxygen, percent | Viscosity, poises |
|---|---|---|
| 1 | 8.60 | 32 |
| 1.5 | 8.71 | 40 |
| 2.5 | 9.00 | 52 |

The reaction was terminated after 2.5 hrs. when the oxirane content reached the desired 9% and the material still had a low viscosity (52 poises). The mixture was quenched with water, cooled, and separated by centrifuging. The oil layer was washed several times with water and dried by azeotropic distillation with benzene, followed by removal of the benzene by distillation in vacuo.

*Example 2*

A mixture of 750 parts of benzene, 16 parts of sodium and 131 parts of a commercial mixed xylene containing 25% ortho-xylene, 46% meta-xylene, 20% para-xylene and 9% ethylbenzene was heated in an autoclave to 90° C. and to it was added a total of 326 parts of butadiene under 15 p.s.i.g. pressure. After the butadiene had been absorbed as revealed by a drop in pressure to about 3 p.s.i.g., the reaction mixture was quenched and neutralized. The oil phase was separated off and washed with water. The copolymer product contained 42% bound xylene.

A mixture of 100 parts of the copolymer of butadiene and xylene, 246 parts of benzene, 10 parts of 90% formic acid, and 5 parts of boric acid was heated to refluxing (about 73° C.), and 80 parts of 50% hydrogen peroxide was added to the refluxing mixture over a period of 45 min. Samples of the reaction mixture were taken at intervals and analyzed for oxirane oxygen and viscosity. Additional hydrogen peroxide was added as indicated in the table.

| Time after end of H₂O₂ addition, hrs. | Ceric sulfate, ml | Oxirane oxygen, percent | Viscosity, poises |
|---|---|---|---|
| 0.6 | 13.7 | | |
| 0.85 (added 5 parts 50% H₂O₂) | | | |
| 1.0 | 17.9 | | |
| 1.5 | 16.4 | 7.90 | 22 |
| 2.0 (added to parts 50% H₂O₂) | 14.0 | | |
| 2.6 | 15.9 | | |
| 3.2 | 15.8 | 8.18 | 40 |

The reaction was terminated at this point and worked up as described in Example 1.

One hundred parts of this product was cured with 80 parts of hexahydrophthalic anhydride, 4 parts of propylene glycol and 2 parts of benzyl dimethylamine. After a 3-hr. precure at 120° C., the product was postcured for 4 hrs. at 150° C. to give a Rockwell M hardness of 95 and a flexural strength of 17,030 p.s.i.

The above example was repeated replacing the boric acid with phosphoric acid. The same quantities of the copolymer of butadiene and xylene, benzene, and formic acid utilized above were heated to refluxing with one part of 85% phosphoric acid, and 80 parts of 50% hydrogen peroxide were added to the refluxing mixture over a period of 60 min. Samples of the reaction mixture were taken at periodic intervals and analyzed for oxirane oxygen and viscosity. Additional hydrogen peroxide was added as indicated in the table.

| Time after end of H₂O₂ addition, hrs. | Ceric Sulfate, ml. | Oxirane Oxygen, Percent | Viscosity, Poises |
|---|---|---|---|
| 0.5 | 23.1 | | |
| 1.0 | 20.5 | | |
| 1.5 (added 5 parts 50% H₂O₂) | 17.2 | 7.60 | |
| 2.0 | 17.0 | 7.49 | 26.0 |

The reaction was terminated at this point since the oxirane content had begun to decrease due to degradation of the product. The product was worked up as described in Example 1.

The product was cured as described above to give a Rockwell M hardness of 84 and a flexural strength of 11,650 p.s.i.

Example 3

This example illustrates the use of a lower reaction temperature. A mixture of 100 parts of the copolymer of butadiene and xylene prepared in Example 2, 246 parts of benzene, 10 parts of 90% formic acid and 5 parts of boric acid was heated to 58° C. and 80 parts of 50% hydrogen peroxide were added to the mixture at 55–60° C. over a period of 30 min. The reaction was stopped 5 hrs. after the end of the hydrogen peroxide addition. The product contained 8.02% oxirane oxygen and had a viscosity of 20 poises.

Example 4

A mixture of 1000 parts of benzene, 190 parts of toluene and 50 parts of kerosene-based sodium dispersion containing 50% sodium was heated in an autoclave to 90° C. and 450 parts of butadiene was added under 15 p.s.i.g. pressure. When all of the butadiene had been added, the mixture was allowed to react for 0.5 hr. and then quenched into excess water. The oil phase from the quench mixture was washed free of inorganic matter and then stripped free of solvent at about 60–70° C. under 5 mm. of pressure. The product from this reaction was an orange-colored oil having a characteristic odor, a viscosity of 0.75 poise at 25° C., and an iodine number of 308. The copolymer product contained 24% bound toluene.

This copolymer of butadiene and toluene was epoxidized according to the procedure described in Example 1. After 3.5 hrs., the product was found to contain 7.44% oxirane oxygen.

Example 5

A mixture of 300 parts of ortho-xylene, 1500 parts of benzene, and 50 parts of sodium dispersed in an equal weight of benzene was heated in an autoclave to 90° C., and to it was added a total of 1000 parts of butadiene under 15 p.s.i.g. pressure. After the butadiene had been absorbed, as indicated by a drop in pressure, the reaction mixture was quenched into excess water and the aqueous phase was discarded. The oil phase was neutralized, washed free of inorganic salts and stripped free of solvent. The residue was a fluid copolymer oil having a viscosity of 2.5 poises at 25° C. and containing 23% bound xylene.

One hundred parts of this copolymer was dissolved in 233 parts of benzene and mixed with 10 parts of 90% formic acid and 5 parts of boric acid. This mixture was agitated, warmed to 65° C., and 80 parts of 50% aqueous hydrogen peroxide were added to it over a period of 1 hr. The reaction mixture was then held at this temperature for 3 hrs., after which time it was cooled and the oil layer was washed and neutralized. The oil phase was dried and distilled free of solvent to yield a viscous liquid containing 6.9% oxirane oxygen and having a viscosity of 2480 poises at 25° C.

As will be apparent to those skilled in the art, numerous modifications and variations of the embodiments illustrated above may be made without departing from the spirit of the invention or the scope of the following claims.

I claim:

1. A method for the epoxidation of a copolymer of butadiene containing 5–50% by weight of an alkyl aromatic comonomer which comprises reacting said copolymer with formic acid and hydrogen peroxide in the presence of 0.02–0.15 mole of boric acid per mole of double bond in the copolymer.

2. A method for the epoxidation of a copolymer of butadiene containing 5–50% by weight of an alkyl aromatic comonomer which comprises reacting said copolymer with 13–50 parts by weight of hydrogen peroxide per 100 parts of copolymer, 0.05–0.25 equivalent of formic acid per double bond equivalent of copolymer and 0.02–0.15 mole of boric acid per mole of double bond in the copolymer at a temperature of 0–100° C.

3. A method for the epoxidation of a copolymer of butadiene containing 5–50% by weight of xylene which comprises reacting said copolymer with 35–50 parts by weight of hydrogen peroxide per 100 parts of copolymer, 0.1–0.2 equivalent of formic acid per double bond equivalent of copolymer and 0.05–0.12 mole of boric acid per mole of double bond in the copolymer at a temperature of 50–80° C.

No references cited.

JOSEPH L. SCHOFER, *Primary Examiner.*